United States Patent
Johnson et al.

(10) Patent No.: US 7,925,666 B1
(45) Date of Patent: Apr. 12, 2011

(54) SYSTEM AND METHOD FOR MANAGING THE APPLICATION OF ACCESS CONTROL LISTS ON NETWORK DEVICES

(75) Inventors: Eric Wendell Johnson, Redmond, WA (US); Richard J. Lamoreaux, Issaquah, WA (US); Jeremy Dinsel, Bothell, WA (US); Ajay K. Gummadi, Bellevue, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1089 days.

(21) Appl. No.: 11/544,251

(22) Filed: Oct. 6, 2006

Related U.S. Application Data

(60) Provisional application No. 60/724,353, filed on Oct. 6, 2005.

(51) Int. Cl.
*G06F 17/30* (2006.01)

(52) U.S. Cl. ........ 707/781; 707/785; 709/223; 709/225; 726/2; 726/3; 726/27

(58) Field of Classification Search .................. 707/781, 707/785, 1, 2, 9; 709/223, 225; 726/2, 3, 726/27
See application file for complete search history.

(56) References Cited

U.S. PATENT DOCUMENTS

| | | | |
|---|---|---|---|
| 6,553,375 B1 * | 4/2003 | Huang et al. | 707/10 |
| 7,054,944 B2 * | 5/2006 | Tang et al. | 709/229 |
| 7,188,164 B1 * | 3/2007 | Etheridge | 709/221 |
| 7,225,263 B1 * | 5/2007 | Clymer et al. | 709/229 |
| 2003/0200466 A1 * | 10/2003 | Nelson et al. | 713/202 |
| 2004/0078457 A1 * | 4/2004 | Tindal | 709/223 |
| 2006/0101019 A1 * | 5/2006 | Nelson et al. | 707/9 |
| 2006/0265760 A1 * | 11/2006 | Daemke et al. | 726/27 |

* cited by examiner

*Primary Examiner* — Hung Q Pham

(57) ABSTRACT

A system and method for managing access control lists on network devices is provided. One or more access control lists are retrieved from one or more computing devices. The one or more access control lists are stored. A request to update the one or more access control lists is received. The one or more access control lists are automatically updated based on the request. The updated one or more access control lists are then deployed to the one or more computing devices.

18 Claims, 6 Drawing Sheets

SYSTEM AND METHOD FOR MANAGING THE APPLICATION OF ACCESS CONTROL LISTS ON NETWORK DEVICES

CROSS-REFERENCE TO RELATED APPLICATIONS

The present application claims the benefit and priority of U.S. provisional patent application Ser. No. 60/724,353 filed on Oct. 6, 2005 and entitled "Method and System for Managing Access Control Lists on Network Devices," which is herein incorporated by reference.

BACKGROUND OF THE INVENTION

1. Field of the Invention

The present invention relates generally to network devices, and more particularly to systems and methods for managing the application of access control lists on network devices.

2. Description of Related Art

Conventionally, access control lists (ACLs) provide security controls for various devices and software associated with a network. The ACLs typically define whether resources are available for specific types of communications via the network. The various devices associated with the network may have varying access privileges within the network. Thus, the ACLs may define who or what is permitted to perform different types of communications.

Managing ACLs is necessary for defining theses access privileges. For example, email traffic from a "known spammer" IP address may be blocked. The access privileges may change, be updated, and so forth. For example, when new personnel join a company or when various devices need to be reconfigured, the access privileges may change. Typically, the management of ACLs is performed manually. Managing ACLs is often extremely difficult and time consuming because of the length, frequency of change, lack of documentation with respect to rules, lack of history showing when various rules were introduced, and so forth. Additionally, in order to modify the ACL, the ACL may need to be removed entirely and recreated. Accordingly, manual management of the ACLs is typically tedious and error-prone.

SUMMARY OF THE INVENTION

The present invention provides a system and method for managing the application of access control lists on network devices. One or more access control lists are retrieved from one or more computing devices. The one or more access control lists are stored. A request to update the one or more access control lists is received. The one or more access control lists are automatically updated based on the request. The updated one or more access control lists are then deployed to the one or more computing devices.

DETAILED DESCRIPTION

The embodiments discussed herein are illustrative of one example of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, these descriptions and drawings should not be considered in a limiting sense, as it is understood that the present invention is in no way limited to only the embodiments illustrated.

Figure 1:
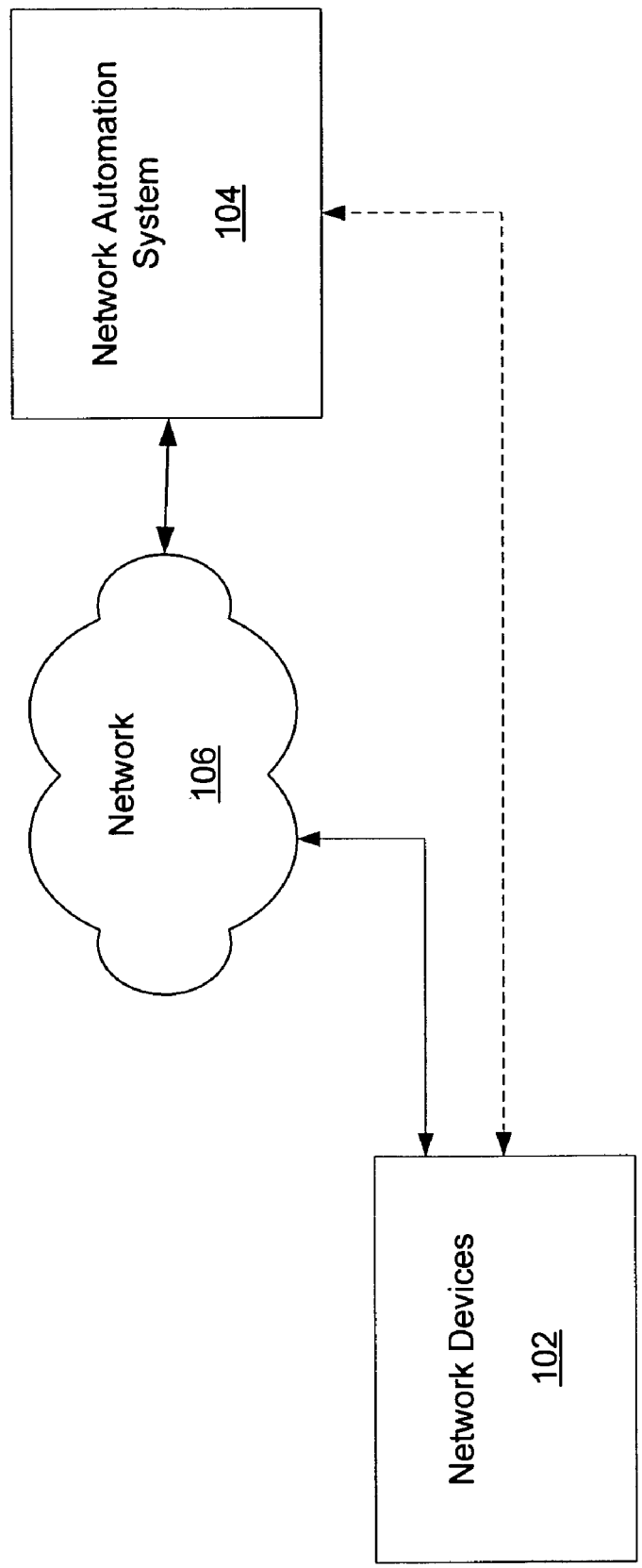
FIG. 1 illustrates a schematic diagram of an exemplary environment for managing the application of access control lists on network devices according to some embodiments.

FIG. 1 illustrates a schematic diagram of an exemplary environment for managing the application of access control lists on network devices according to some embodiments. One or more user devices, such as a user device are coupled to one or more network devices, such as a network device 102. The user device may comprise a laptop computer, a desktop computer, a cellular telephone, and personal digital assistant, and so forth.

The network device 102 may comprise routers, bridges, modems, switches, load balancers, firewalls, wireless access points, and so forth. The network device 102 may comprise any device that provides network connectivity, according to exemplary embodiments. The network device 102 is in communication with a network automation system 104 via a network 106. The network 106 may comprise a wide area network, a local area network, a peer to peer network, Internet, or any other type of network. According to exemplary embodiments, the network 106 comprises more than one network.

The network automation system 104 manages access control lists associated with the network device 102 and/or the user device. According to exemplary embodiments, the network automation system 104 manages the application of access control lists (ACLs) on the network device 102. The network automation system 104 can also manage the application of ACLs associated with one or more of the user device.

The network automation system 104 can manage configuration information for the network 106 and/or the devices coupled to the network, such as the user device and the network device 102, according to some embodiments. The network automation system 104 may comprise a server or any other computing device capable of managing the application of the ACLs on computing devices, such as the network device 102 and/or the user device.

In exemplary embodiments, the network automation system 104 or any digital device may comprise a communications interface, an access control storage medium, and a processor. The communications interface may be configured to receive one or more access control lists from one or more computing devices (further discussed in FIG. 2) including, but not limited to, a network device 104, a user device, or any other device coupled to the network 106. The communications interface may also be configure to receive a request to deploy modified access control lists to the one or more computing devices and/or transmit one or more modified access control lists to the one or more computing devices. The access control storage medium may be any medium configured to store the access control lists. The access control storage medium may comprise a hard drive, random access memory, USB drive, or any other memory. The processor may be configured to automatically update one or more access control lists based on a request to deploy updated access control lists.

As discussed herein, the one or more network devices 102 may each be coupled to more than one network 106. The network automation system 104 searches each of the networks for the ACLs associated with each of the network devices 102, and/or the user devices according to some embodiments. The ACLs are then evaluated by the network automation system 104 to determine whether the ACLs need to be updated, such as by modifying, replacing, and so forth the ACLs. ACL updates are discussed further in association with FIGS. 3-6.

Each of the user device and/or the network device 102 may have one or more applications associated with the user device and/or the network device 102. The user device, the network device 102, and the applications associated with the user device and the network device 102 may comprise objects. Each of the objects may include one or more ACLs and configuration information, according to exemplary embodiments. The network automation system 104 can update each ACL based on the configuration information or any other information. An object may be a hardware or software. Examples of software objects include resources and applications. The network device 102, the network 106, the network automation system 104, and user devices may comprise any number of objects. Because there can be potentially thousands of objects, tracking and managing ACLs associated with one or more objects within a changing environment can quickly become overwhelming and problematic without the use of an ACL management system, which will be discussed in more detail below.

Figure 2:
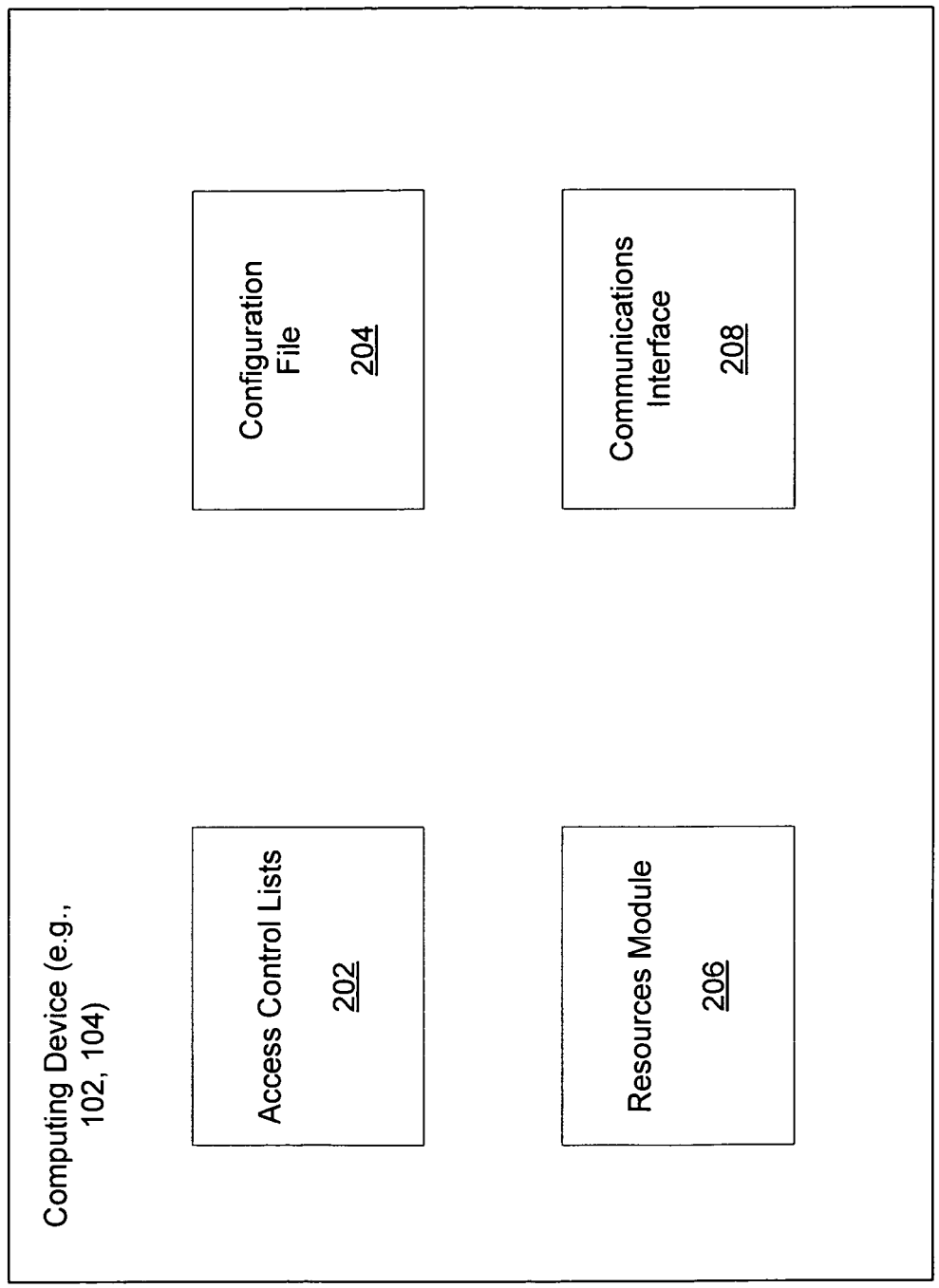
FIG. 2 illustrates a block diagram of an exemplary user device according to some embodiments.

Referring now to FIG. 2, a block diagram of an exemplary computing device according to some embodiments is illustrated. The computing device may comprise the user device and/or the one or more network devices 102. Each computing device includes one or more device access control lists 202, such as the ACLs discussed herein. The device ACLs 202 describes access rights for individual users and whether specific resources are available for specific types of communications via the network 106. In other words, the device ACLs 202 include detailed definitions of communication patterns that are accepted or rejected by the computing device, such as the network devices 102, associated with the device ACLs 202 or applications on the computing device. A list of ACLs, such as the device ACLs 202, may be prioritized.

The computing device also includes a configuration file 204. The configuration file 204 includes configuration information about how the network device 102 is configured to operate, for example. For example, the configuration file 204 associated with the network device 102 may include a text file, configuration settings, SNMP-based or XML-based settings, physical files, binary files, and so forth. The device ACLs 202 are consistent with the configuration file 204 for the network device 102 and thus, updates to the ACLs 202 are also consistent with the configuration information included in the configuration file 204 for the particular network device 102. According to exemplary embodiments, one or more applications on the network device 102 each include the configuration file 204.

A resources module 206 defines other attributes that make up the configuration of the computing device, such as the user device and/or the network device 102. According to exemplary embodiments, the user device, the network device 102, and any applications residing on the user device and/or the network device 102 are all regarded as objects. The device 202 ACL is then associated with each object, whether the object is hardware, such as the network device 102, or software, such as the applications associated with the network device. The resources module 206 may then define the configuration associated with each of the objects.

A communications interface 208 allows the user device and/or the network device 102 to communicate with one anther, and/or with the network automation system 104 via the network 106. Any type of communications interface 208 may be provided.

Figure 3:
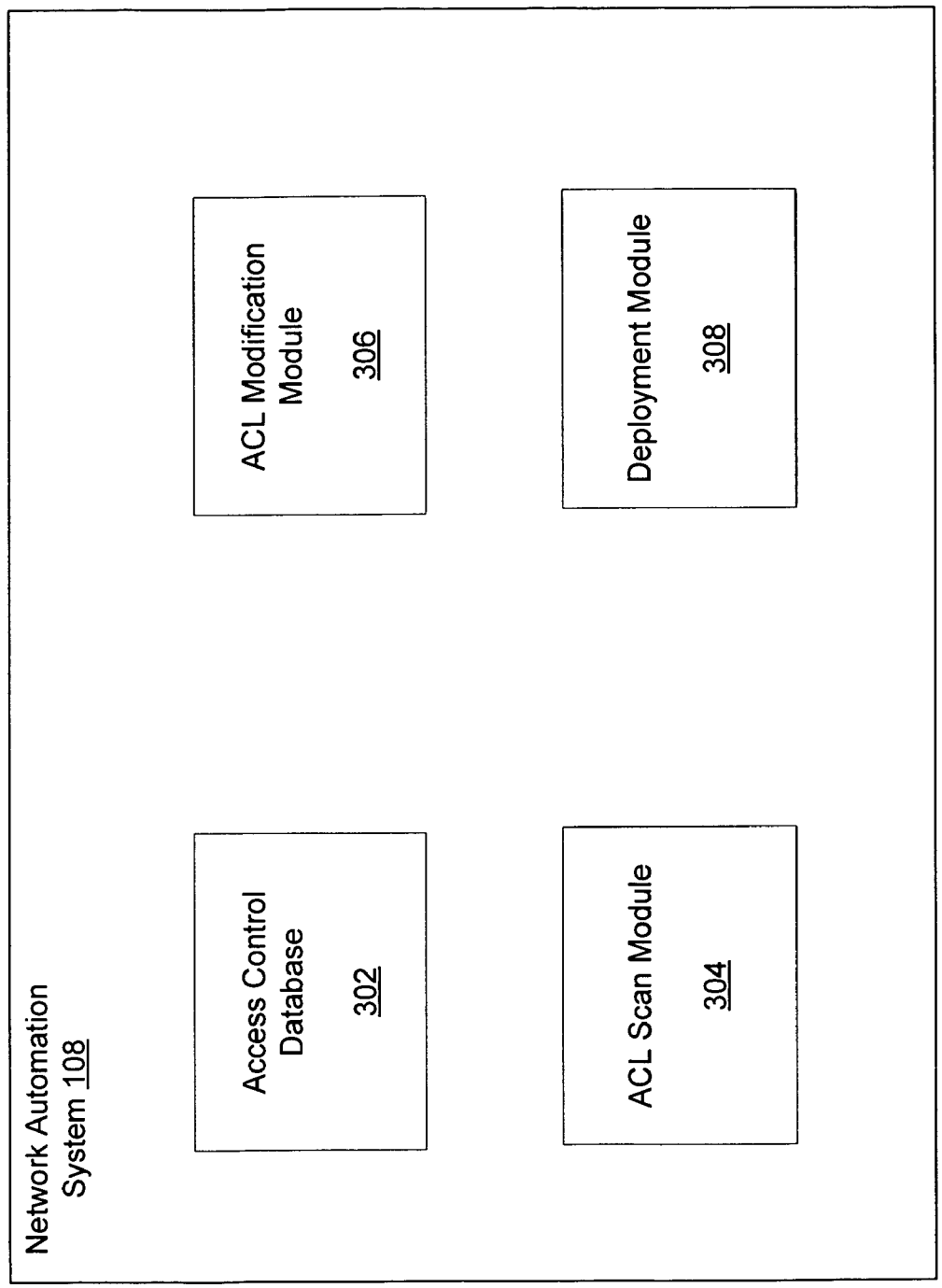
FIG. 3 illustrates a block diagram of an exemplary network automation system according to some embodiments.

FIG. 3 illustrates a block diagram of an exemplary network automation system according to some embodiments. An access control database 302 maintains a list of the one or more ACLs associated with each of the objects, as discussed herein. The network automation system 104 retrieves the ACLs from each of the objects associated with each of the networks, such as the network 106 discussed in FIG. 1. Once the ACLs, such as the device ACLs 202 associated with the user device and/or the network device 102, are retrieved, the access control database 302 may be updated to include new ACLs located by the network automation system 104.

According to exemplary embodiments, the access control database 302 can be searched for ACLs. For example, a user may search the access control database 302 for ACLs that are inactive. In one example, the user may access a graphical display that depicts each object (e.g., device on the network 106 and applications contained within the devices.) The user may choose an object to see the associated device ACL 202. In other embodiments, the user may search by type of application (e.g., web server) type of device (e.g., router) network 106, or person related device ACLs. In one example, the user may search for a particular name. ACLs containing the name or user identity may then be provided.

In some embodiments, the access control database 302 can be searched for ACLs based on application. The user may access the graphical display and search for an application on a given hardware device or a category of applications. In one example, the user may search to retrieve all ACLs of FTP servers associated with network devices 102. Those skilled in the art will appreciate that there may be many ways to search for ACLs of software and hardware objects.

An ACL scan module 304 searches the objects for the ACLs. The ACL scan module 304 may automatically search for the objects' ACLs according to a schedule, in response to a user request, or for any other reason. The ACL scan module 304 may update the access control database 302 with any new ACLs discovered during the scan, such as in response to the addition of a new object on the network 106.

In some embodiments, the ACL scan module 304 scans for new devices and installed applications at given intervals or set time. The ACL scan module 304 may also scan for new devices and installed applications once a new device is added to the network 106. In one example, a new device, such as a router, is installed on the network 106. The network automation system 104 identifies the router and then may direct the ACL scan module 304 to find the router to retrieve any ACLs associated with the router as well as scan for any applications installed on the router.

An ACL modification module 306 automatically updates the ACL associated with the objects located by the ACL scan module 304. For example, a user may request an update to the ACLs associated with a particular router. The ACL scan module 304 searches for the ACLs associated with the particular router. As discussed herein, the router may include various ACLs for the router, itself, as well as one or more applications associated with the router.

The ACL modification module 306 parses the ACLs based on information in the configuration file 204 for the computing device and/or the objects. The ACL modification module 306 can store the ACLs in the access control database 302, as discussed herein.

The ACL modification module 306 then updates the ACLs associated with the router. The updated ACLs may comprise modified ACLs, replacement ACLs, reinstalled ACLs, archived ACLs, template ACLs, and so forth. According to some embodiments, updating the ACLs includes removing the ACLs, deactivating specified ACLs, and so forth. Any type of updating may be performed by the network automation system 104. As discussed herein, the updates to the ACLs are consistent with the configuration file 204 associated with the object, such as the router and the applications associated with the router, discussed in the example herein.

In some embodiments, the network automation system 104 maintains a database of objects as well as access directions and instructions to find and update ACLS. The database may identify installed objects as well as objects that are not yet installed. In one example, the database identifies an installed router. When the ACL modification module 306 wishes to update the installed router, the ACL modification module 306 may access the router by retrieving the proper username and password from the trusted network automation system 104. The ACL modification module 306 may then follow the instruction within the network automation system 104 to replace or otherwise update one or more ACLs associated with the router or applications within the router.

A deployment module 308 forwards the updates to the objects. In the router example, the deployment module 308 forwards instructions to the router for replacing, modifying, and so forth the ACLs associated with the router. The updated ACLs are automatically deployed by the deployment module 308 after they are updated by the ACL modification module 306.

In some embodiments, the network automation system 104 maintains a database of objects as well as access directions and instructions to find and update ACLS. The database may identify installed objects as well as objects that are not yet installed. In one example, the database identifies an installed router. When the deployment module 308 wishes to update the installed router, the deployment module 308 may access the router by retrieving the proper username and password from the trusted network automation system 104. The deployment module 308 may then follow the instruction within the network automation system 104 to replace or otherwise update one or more ACLs associated with the router or applications within the router.

Although FIG. 3 shows various modules associated with the network automation system 104 (e.g., the access control database 302, the ACL scan module 304, the ACL modification module 306, and the deployment module 308), fewer or more modules may be associated with the network automation system 104 and still fall within the scope of various embodiments.

Figure 4:
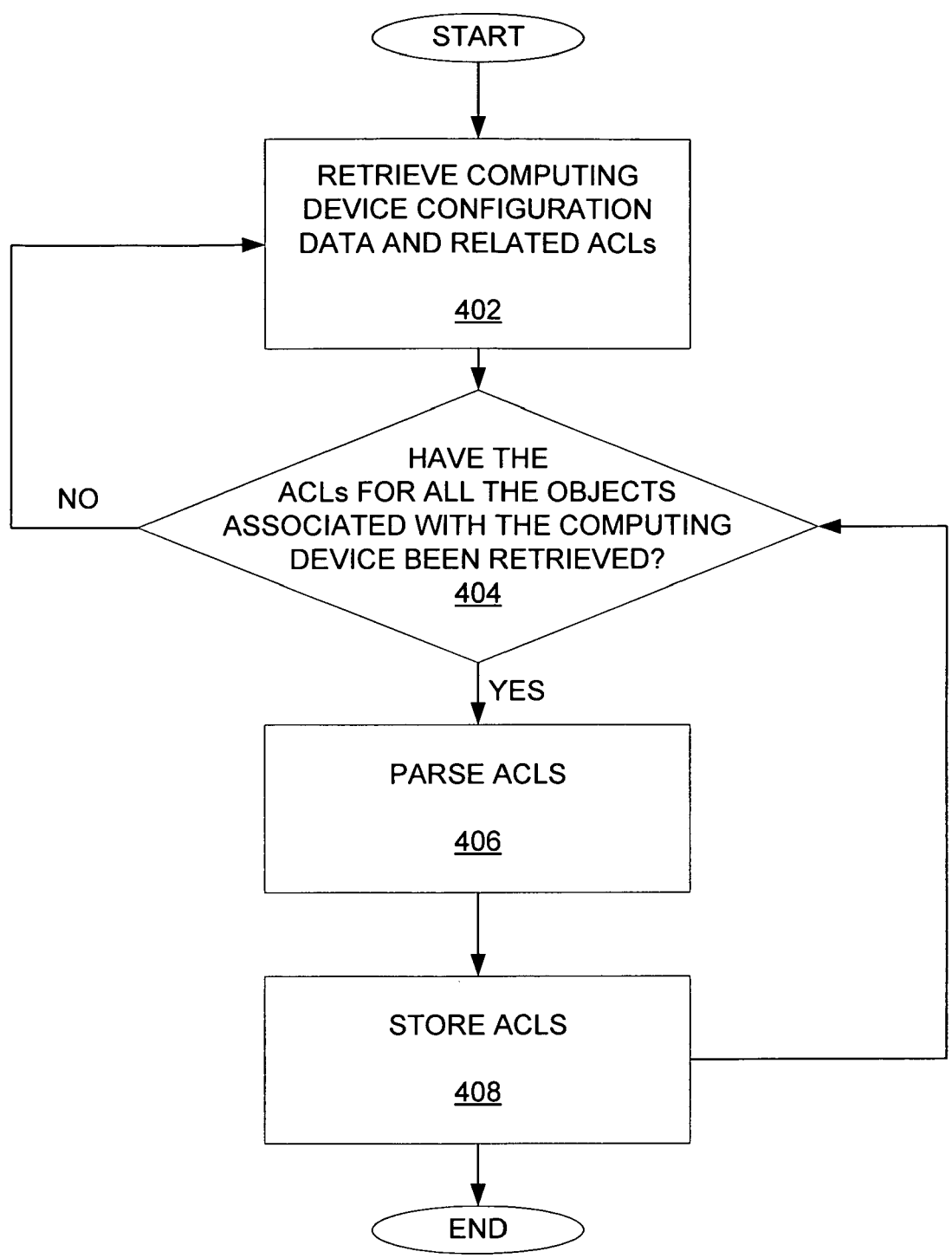
FIG. 4 illustrates a flow diagram of an exemplary process for accessing ACLs according to some embodiments.

FIG. 4 shows a flow diagram of an exemplary process for accessing ACLs according to some embodiments. At step 402, configuration data from the computing device and related ACLs is retrieved. As discussed herein, the network automation system 104 can scan the network 106 to locate the ACLs for various objects, such as the computing device and associated applications residing on the computing device. Each of the objects may have configuration information, such as in the configuration file 204, associated with the object.

At step 404, the network automation system 104 determines whether the ACLs for all the objects associated with the computing device have been retrieved. As discussed herein, the network automation system 104 retrieves the ACLs for the computing device, itself, such as the network device 102, and for the objects, such as applications, associated with the network device 102. If all of the ACLs for the objects have not been retrieved, the network automation system 104 continues to retrieve the configuration data and the ACLs at step 402.

If the ACLs for all of the objects have been retrieved at step 404, the ACLs are parsed, at step 406. Parsing may be performed by the ACL scan module 304 discussed in FIG. 3, by a parsing module (not shown) associated with the network automation system 104, or by any other module. The parsing extracts and normalizes the definition of the ACLs utilizing the configuration information, according to exemplary embodiments.

At step 408, the ACLs are stored. For example, the ACLs may be stored in the access control database 304 associated with the network automation system 104. As discussed herein, the stored ACLs may be searched, deployed, and so forth. For example, the access control database 302 may be searched for ACL information and the ACL information may displayed to a user, archived, exported, and so forth.

Figure 5:
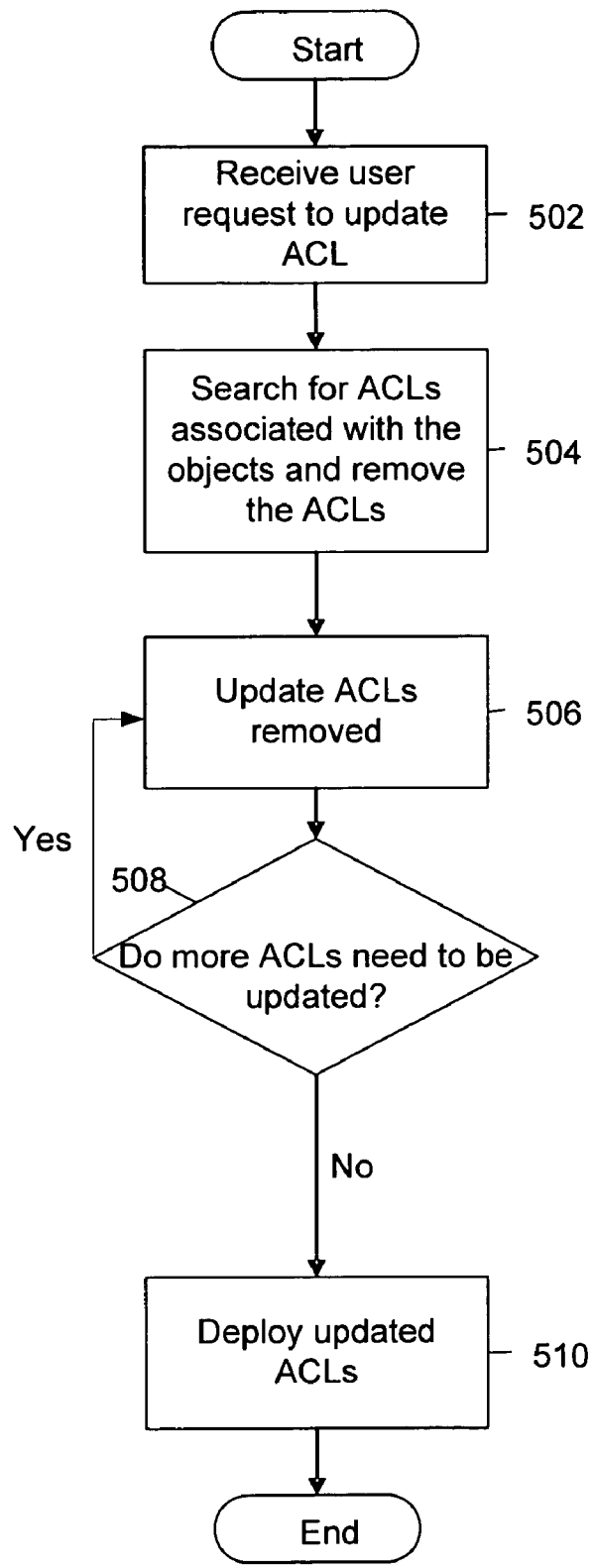
FIG. 5 illustrates a flow diagram of an exemplary process for deploying ACLs according to some embodiments.

Referring now to FIG. 5, a flow diagram of an exemplary process for deploying ACLs according to some embodiments is shown. At step 502, a user request to update the ACLs is received. The user request may be received by the object, itself, such as the user device, or by the network automation system 104 via the object. The user may specify the objects whose ACLs need to be updated, the network automation system 104 may automatically locate the objects with ACLs that need to be updated, the user may indicate that a person or device has been added for which ACLs need to be updated, and so forth.

In some embodiments, the user request is authenticated by the network automation system 104 to prevent tampering or human error. The user request may be digitally signed, comprise an encryption key, or may be otherwise authenticated. In one example, the network automation system 104 is previously configured to identify a specific username and password at a predetermined IP or MAC address. If these conditions are met, the network automation system 104 may accept the user request. Otherwise the user request may be rejected. Those skilled in the art will appreciate that there may be many ways to authenticate a user request before allowing changes or displaying ACL information.

At step 504, the ACLs associated with the objects are searched for and removed. As discussed herein, the network automation system 104 can search the network 106 for the objects and the ACLs associated with each of the objects. The ACLs associated with each of the objects may then be removed, such as by disassociating each ACL with each object or by any other process.

At step 506, the removed ACLs are updated. As discussed herein, the ACL modification module 306 can update the ACLs, taking into consideration the configuration information for each object associated with a particular ACL.

In some embodiments, specific applications or services may be required to be reinstalled or updated before the updated ACL will function appropriately. In one example, the network automation system 104 reinstalls an SMTP application or virtual port application within a router when updating the associated ACL. As discussed previously, the network automation system 104 may comprise a database of usernames and passwords to access network devices 102. The database may also comprise instructions to be executed when replacing, updating, or installing ACLs and/or objects.

At step 508, the network automation system 104 determines whether more ACLs need to be updated. For example, more applications associated with a particular device, such as the network device 102, may require updates. If more ACLs need to be updated, the ACLs are updated at step 506. If no other ACLs need to be updated, the updated ACLs are deployed, at step 510. As discussed herein, the deployment module 308 can deploy the updated ACLs by sending new ACLs to the objects, or by any other method for deploying the updated ACLs.

According to some embodiments, the ACL for each object is modified rather than being removed, updated, and deployed. Any type of update to the ACLs is within the scope of various embodiments.

Figure 6:
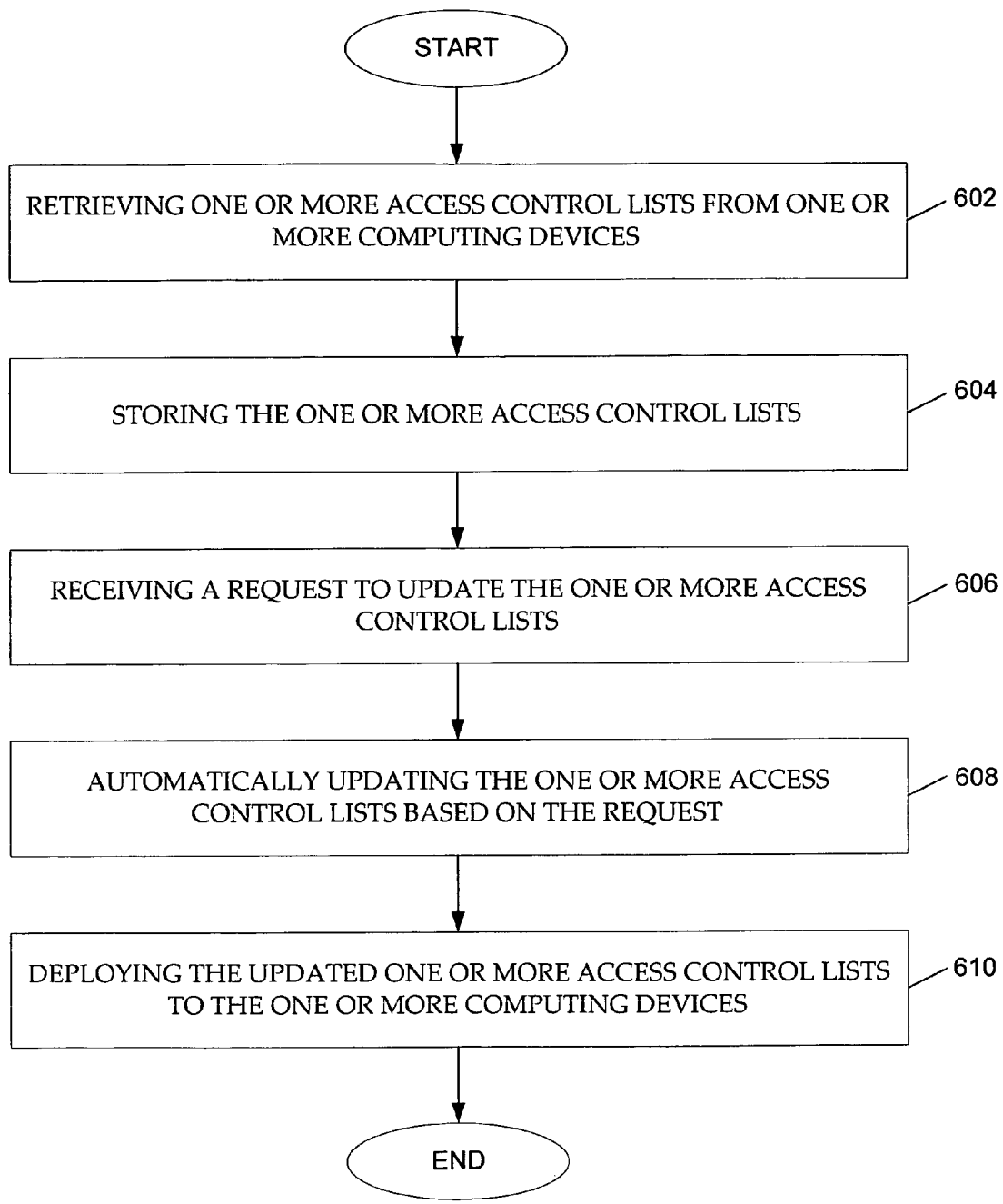
FIG. 6 illustrates a flow diagram of an exemplary process for managing the application of access control lists on network devices according to some embodiments.

FIG. 6 illustrates a flow diagram of an exemplary process for managing the application of access control lists on network devices according to some embodiments. At step 602, one or more access control lists (ACLs) are retrieved from one or more computing devices. As discussed herein, the computing devices may comprise the user device and/or the network device 102 discussed herein. Each of the one or more computing devices may include more than one ACL, such as an ACL for the computing device, itself, as well as one or more ACLs for applications associated with the computing device.

At step 604, the one or more access control lists are stored. As discussed herein, the ACLs may be stored in the access control database 302 at the network automation system 104. The ACLs may be stored as retrieved from the objects and/or after the ACLs are updated. According to exemplary embodiments, the stored ACLs may be searched via the access control database 302.

At step 606, a request to update the one or more access control lists is received. As discussed herein, the request may be received from a user. According to some embodiments, the objects, such as a new application or new computing device, may automatically request updates when the new application or the new computing device is added to the network 106.

In one example, a spammer is identified as sending spam to users on a network. A request to update network devices to block all email from a specific IP address may be received. The network automation system 104 may search for all stored ACLs that may be effected, update the ACLs to reflect the instruction from the request, and deploy them modified ACLs to all affected network devices and other affected objects (e.g., services and/or applications resident in the network devices.)

At step 608, the one or more access control lists are automatically updated based on the request. As discussed herein, the update to the access control lists may comprise removal, modification, and replacement of at least one of the ACLs, removal of at least one the ACLs, deactivation of at least one of the ACLs, and so forth.

Each ACL associated with the computing device may be updated differently, according to exemplary embodiments. For example, different network ports associated with the network device 102 may each have different ACLs, allowing for different traffic flows. In one instance, the network port interfacing with the Internet has different privileges associated with the ACL than the port interfacing a private intranet.

At step 610, the updated one or more access control lists are deployed to the one or more computing devices. As discussed herein, the deployment module 308 associated with the network automation system 104 may deploy the updated ACLs. The updated ACLs may be deployed with instructions for the objects to replace the existing ACLs, install the new ACLs, and so forth. Any manner of deployment is within the scope of various embodiments.

The above-described functions, components, modules, engines and systems can be comprised of instructions that are stored on a storage medium and/or may be implemented as hardware modules. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

While various embodiments have been described above, it should be understood that they have been presented by way of example only, and not limitation. For example, any of the elements associated with the network automation system 106 may employ any of the desired functionality set forth hereinabove. Thus, the breadth and scope of a preferred embodiment should not be limited by any of the above-described exemplary embodiments.

What is claimed is:

1. A method for managing the application of access control lists on network devices comprising:

retrieving, by a centralized network automation system, one or more access control lists from one or more computing devices;

storing the one or more access control lists in the centralized network automation system;

automatically updating the one or more access control lists based on at least one of a schedule, a pre-defined time period, and detection of a computing device being added to a network; and deploying the updated one or more access control lists to the one or more computing devices.

2. The method recited in claim 1, wherein deploying the updated one or more access control lists includes updating one or more applications associated with the one or more access control lists.

3. The method recited in claim 1, further comprising searching for the one or more access control lists based on a configuration associated with the one or more computing devices.

4. The method recited in claim 1, wherein the computing device comprises a network device.

5. The method recited in claim 1, wherein the one or more access control lists are associated with at least one object associated with each of the one or more computing devices.

6. The method recited in claim 5, further comprising re-installing the object associated with the one or more computing devices.

7. A system for managing the application of access control lists on network devices, comprising:

a communications interface configured to receive one or more access control lists from one or more computing devices;

an access control storage medium configured to store the one or more access control lists; and a processor configured to automatically update the one or more access control lists based on at least one of a schedule, a pre-defined time period, and detection of a computing device being added to a network, and to deploy the updated one or more access control lists to the one or more computing devices.

8. The system recited in claim 7, wherein, to deploy the updated one or more access control lists, the processor updates one or more applications associated with the one or more access control lists.

9. The system recited in claim 7, wherein the processor is further configured to search for the one or more access control lists based on a configuration associated with the one or more computing devices.

10. The system recited in claim 7, wherein the computing device comprises a network device.

11. The system recited in claim 7, wherein the one or more access control lists are associated with at least one object associated with each of the one or more computing devices.

12. The system recited in claim 11, wherein the processor is further configured to re-install the object associated with the one or more computing devices.

13. A computer program embodied on a computer readable medium, the computer program being executable by a processor for performing a method for managing the application of access control lists on network devices, the method comprising the steps of:
   retrieving one or more access control lists from one or more computing devices;
   storing the one or more access control lists;
   automatically updating the one or more access control lists based on at least one of a schedule, a pre-defined time period, and detection of a computing device being added to a network; and
   deploying the updated one or more access control lists to the one or more computing devices.

14. The computer program recited in claim 13, wherein deploying the updated one or more access control lists includes updating one or more applications associated with the one or more access control lists.

15. The computer program recited in claim 13, further comprising searching for the one or more access control lists based on a configuration associated with the one or more computing devices.

16. The computer program recited in claim 13, wherein the computing device comprises a network device.

17. The computer program recited in claim 13, wherein the one or more access control lists are associated with at least one object associated with each of the one or more computing devices.

18. The computer program recited in claim 17, further comprising re-installing the object associated with the one or more computing devices.

* * * * *